(12) United States Patent
Speichermann et al.

(10) Patent No.: US 11,881,576 B2
(45) Date of Patent: Jan. 23, 2024

(54) FUNCTIONALLY INTEGRATED SEPARATOR, A BATTERY CELL COMPRISING THE SEPARATOR AND METHODS FOR PROVIDING THE SEPARATOR AND THE BATTERY CELL

(71) Applicant: Dr. Ing. h.c. F. Porsche Aktiengesellschaft, Stuttgart (DE)

(72) Inventors: Justus Speichermann, Stuttgart (DE); Christoph Orth, Marbach (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 26 days.

(21) Appl. No.: 17/737,127

(22) Filed: May 5, 2022

(65) Prior Publication Data
US 2022/0359933 A1    Nov. 10, 2022

(30) Foreign Application Priority Data
May 6, 2021 (DE) ..................... 10 2021 111 741.0

(51) Int. Cl.
*H01M 10/6568* (2014.01)
*H01M 10/613* (2014.01)
*H01M 10/654* (2014.01)
*H01M 10/6556* (2014.01)
*H01M 50/531* (2021.01)
*H01M 50/46* (2021.01)
*H01M 50/491* (2021.01)
*H01M 50/497* (2021.01)
*H01M 50/406* (2021.01)
(Continued)

(52) U.S. Cl.
CPC ..... *H01M 10/6568* (2015.04); *H01M 10/613* (2015.04); *H01M 10/654* (2015.04); *H01M 10/6556* (2015.04); *H01M 10/6567* (2015.04); *H01M 50/406* (2021.01); *H01M 50/46* (2021.01); *H01M 50/463* (2021.01); *H01M 50/491* (2021.01); *H01M 50/497* (2021.01); *H01M 50/531* (2021.01)

(58) Field of Classification Search
CPC .......... H01M 10/6568; H01M 10/613; H01M 10/654; H01M 10/6556; H01M 10/6567; H01M 50/406; H01M 50/46; H01M 50/463; H01M 50/491; H01M 50/497; H01M 50/531
See application file for complete search history.

(56) References Cited

U.S. PATENT DOCUMENTS
1,243,368 A    10/1917    Willard

FOREIGN PATENT DOCUMENTS
JP    2018018661 A  *  2/2018 .............. H01M 2/20

OTHER PUBLICATIONS
Machine translation of JP-2018018661-A (Year: 2018).*

* cited by examiner

*Primary Examiner* — Eugenia Wang
(74) *Attorney, Agent, or Firm* — RatnerPrestia

(57) ABSTRACT

A separator for spatially separating and electrically isolating electrodes in a battery cell. The separator has a receptacle for at least one galvanic cell which includes an anode and a cathode; a structure composed of conductive material for electrically connecting the anode and cathode to one another and for making contact with the at least one galvanic cell from outside; and a duct system for forming a cooling fluid flow in the separator. At least the receptacle and the duct system are integrally formed in the separator.

5 Claims, 1 Drawing Sheet

(51) Int. Cl.
*H01M 50/463* (2021.01)
*H01M 10/6567* (2014.01)

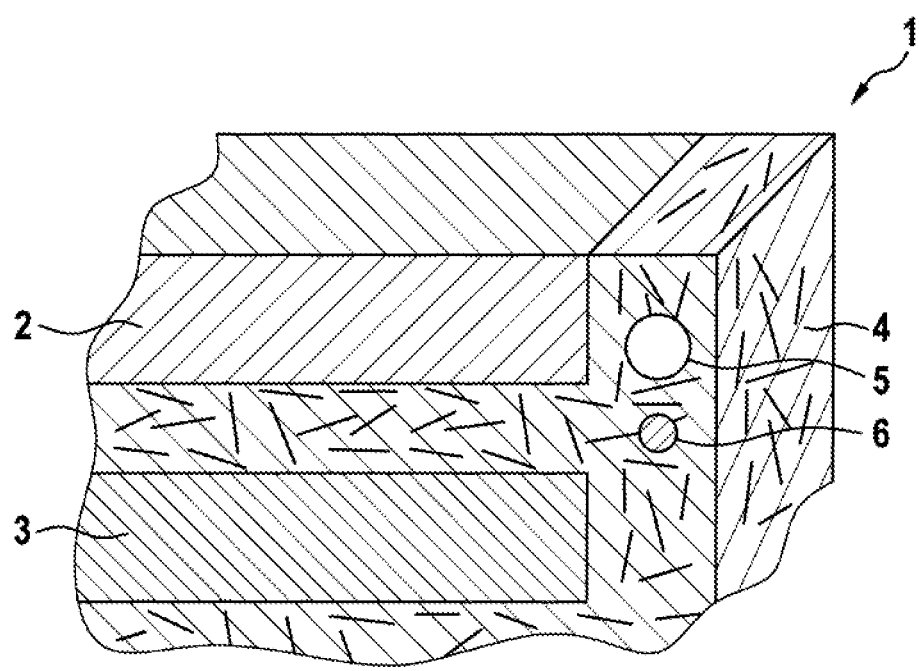

FUNCTIONALLY INTEGRATED SEPARATOR, A BATTERY CELL COMPRISING THE SEPARATOR AND METHODS FOR PROVIDING THE SEPARATOR AND THE BATTERY CELL

CROSS-REFERENCE TO RELATED APPLICATION

This application claims priority to German Patent Application No. 10 2021 111 741.0, filed May 6, 2021, the content of such application being incorporated by reference herein in its entirety.

FIELD OF THE INVENTION

The present invention relates to a functionally integrated separator which, on account of its advantageous mechanical and functional properties, can be used, in particular, for constructing a traction battery in an electric vehicle.

BACKGROUND OF THE INVENTION

Given the continuously increasing number of hybrid and, in particular, electric vehicles, the traction battery as an energy storage plays a very important role since it has a considerable influence on the range of the vehicles. Batteries known from the prior art consist of individual cells, such as round cells and prismatic hardcase/pouch cells for example, which are combined to form cell modules or to directly form battery systems. These cell modules or battery systems consist of at least two individual cells. Cell modules are joined to form battery systems. These battery systems are ultimately installed in the vehicle.

As is known, a battery cell has a cathode and an anode which are spatially separated by a separator. The separator accordingly undertakes the central task of spatially separating and thereby at the same time electrically isolating the electrodes from one another and therefore prevents electrical shorts. The separator can be provided, for example, in the form of a separator film sheet between the anode and cathode electrodes. As an alternative, a separator for the entire cell can be provided, such as in the case of Z-folding of the separator for specific cell variants for example, or can be manufactured from one piece, such as in the case of a round cell for example.

In the case of the currently extremely popular and extensively used in lithium-ion cells, the separator is embodied as a porous film composed of single- to multilayer plastic films. Furthermore, the separator can be embodied from/with (additional) ceramic components.

SUMMARY OF THE INVENTION

Described herein is a separator with which a compact and lightweight battery cell can be constructed.

According to aspects of the invention, a separator for spatially separating and electrically isolating electrodes is provided in a battery cell. The separator has a receptacle for at least one galvanic cell which comprises an anode and a cathode, and a structure composed of conductive material for electrically connecting the anode and cathode to one another and for making contact with the at least one galvanic cell from outside. The separator further has a duct system for forming a cooling fluid flow in the or through the separator. The separator according to aspects of the invention is distinguished in that at least the receptacle for the at least one galvanic cell and the duct system are integrally formed in the separator.

The separator according to aspects of the invention is a functionally integrated separator which undertakes new functions, which will be discussed in more detail below, in addition to the function of protection against electrical shorts between anode(s) and cathode(s) by way of being spatially separated.

The separator according to aspects of the invention can be manufactured by means of an additive production method, for example 3D printing. In this case, the separator can be produced separately from the at least one galvanic cell, which is inserted subsequently. During production of a corresponding battery cell, the separator can preferably be manufactured around correspondingly arranged cathodes and anodes, so that these cathodes and anodes are integrated/embedded in the separator during the production process as a result.

According to various embodiments of the separator, a material which cures with a time delay can be contained in this separator, that is to say in the separator structure or in the "separator framework", as a result of which the separator acquires its ultimate strength. The curing process can be induced due to expiry of time or due to heat. Therefore, the separator can cure, for example, only when a corresponding battery cell is first commissioned and due to the heat emitted by the electrodes. In particular, the curing process may be irreversible, as a result of which the mechanical strength in the ultimate three-dimensional form of the separator is achieved. The time-delayed curing process can take place, for example, on a short timescale which is selected such that the final strength is achieved in a timely manner in order to be able to directly apply the next material layer for forming the separator structure using the additive production method for example. However, the time-delayed curing process can also take place, for example, over a long timescale which is selected such that the separator can be produced and is initially elastic enough to be able to fit it with the electrodes of the at least one galvanic cell. In general, the viscosity of the material, which for forming the separator can be adapted such that the separator structure is not connected to the anode and cathode electrodes.

According to various embodiments of the separator, this separator can have a porosity which permits ion transport. The porosity can be provided as a property of the material used for producing the separator as early as during application, that is to say when forming the separator structure.

According to various embodiments of the separator, an evaporable solvent can be contained in this separator. By way of evaporating the solvent, for example by means of heat treatment or UV irradiation, the porosity in the separator structure can also be created subsequently. This applies to liquid-based electrolytes and solid electrolytes.

According to further embodiments of the separator, the duct system formed therein can be formed by hollow molds arranged in the separator. In this case, the hollow molds can be inserted during manufacture of the separator structure. After curing of the separator structure, these hollow molds can be dissolved with a solvent, as a result of which the shaped cooling ducts/systems are created.

In the event of the separator having a porosity, the hollow molds can have two layers, for example. The inner layer can be dissolved with a solvent. The outer layer remains and therefore establishes the leaktightness. As an alternative, after the single-layer hollow mold has been dissolved by a solvent, a sealing means which seals off the porous openings in the separator at the interface to the dissolved hollow mold can be introduced. Therefore, overall, a duct system for a cooling system can be formed in the separator, which duct system has a small number of partial components with a small number of interfaces and therefore a small number of potential leakage points.

When using the separator according to aspects of the invention for constructing a corresponding battery cell, this separator allows mechanical fixing of further components, such as anode electrodes/stacks, busbars etc. for example, for ensuring mechanical stability in the event of vibrations and shocks occurring in the vehicle. In this case, the separator according to aspects of the invention can be loaded with tension, pressure and torsion in all directions owing to its integral design. Nevertheless, the material of the separator can preferably have an elasticity which is enough to be able to compensate for, for example, tolerance fluctuations, aging effects or resulting material stresses due to temperature differences.

The separator according to aspects of the invention can further have reinforcement elements embedded therein, such as metal profiles and/or glass fibers for example, which can be introduced into the separator during production thereof in order to achieve a predetermined mechanical strength in the final form or in order to increase this mechanical strength even further.

In various embodiments, a battery cell is provided which has at least one galvanic cell which comprises an anode and a cathode, wherein the at least one galvanic cell is embedded or arranged in the above-described separator according to aspects of the invention, so that, by means of the structure composed of conductive material, the at least one galvanic cell can be contacted from outside and its anode and cathode are electrically connected to one another and a cooling circuit is realized by means of the duct system. In order to form the cooling circuit, the duct system can be coupled to a coolant reservoir and a pump. Overall, the battery cell formed in this way can have all of the above-described spatially structural properties of the separator according to aspects of the invention. In the case of a battery cell constructed on the basis of the separator according to aspects of the invention, this separator can enclose or contain at least two electrode stacks consisting of anodes and cathodes as a galvanic cell in each case. The separator can particularly preferably an integrally coherent component for the entire battery system and includes all the galvanic cells. An integrally coherent component may be understood to mean a component which does not have any conventional joints at which separate parts are joined by means of adhesive bonding, welding, riveting or the like, but rather is produced in one piece during the course of a production method, for example by additive manufacture, for example by way of a 3D printing method.

A battery cell constructed on the basis of the functionally integrated separator according to aspects of the invention may be a monocell for direct use in a traction battery. Subcomponents of the battery known previously from the prior art, such as cell sleeves, cell module frames etc. for example, can be dispensed with since their functions are undertaken by the separator. Owing to the use of the functionally integrated separator according to aspects of the invention, batteries can be produced which are smaller, lighter and additionally easier to manufacture than previous batteries. In this case, the previous properties of a conventional separator—electrical isolation and spatial separation of the electrodes of the galvanic cell—are not negatively influenced by the increase in the range of functions according to aspects of the invention of the separator described here. In addition, further components of a battery of conventional construction, such as the electronics for monitoring individual electrode stacks for example, can be used as before and advantageously can be embedded directly into the separator and in this way can be mechanically fixed by this separator.

The busbars separately insulated in batteries known to date can likewise be provided in a manner integrated/embedded in the separator. As a result, less installation space and material are required, as a result of which a corresponding battery is lighter overall.

According to aspects of the invention, a method for producing a separator is further provided, which method comprises the step of forming a separator structure by means of an additive method. The step of forming the separator structure comprises forming a number of cavities as a receptacle for at least one galvanic cell which comprises an anode and a cathode, forming a structure composed of conductive material for electrically connecting the anode and cathode to one another and for making contact with the at least one galvanic cell from outside and forming a duct system for forming a cooling fluid flow in or through the separator. In this case, at least the receptacle for the at least one galvanic cell and the duct system are integrally formed in the separator. The separator provided may be, in particular, the separator already described above.

The structure composed of conductive material can take place by depositing an electrically conductive material directly during production of the separator according to aspects of the invention or by positioning/inserting prefabricated electrically conductive elements in suitable positions within the separator structure during production of the separator structure.

According to further embodiments of the method, the duct system can be formed by inserting hollow molds into the separator structure. The hollow molds can be of single-layer or double-layer design and can be placed in suitable positions in the "developing" separator structure during the additive production method.

According to further embodiments of the method, a material which cures with a time delay can be contained in the material of the separator or the separator structure, as a result of which the separator acquires its ultimate strength. This aspect has already been discussed in the details relating to the nature of the separator according to aspects of the invention.

According to further embodiments of the method, an evaporable solvent can be contained in the material of the separator structure. As already described, in the case of a non-porous separator structure, a porosity can be formed by evaporating the solvent in the separator structure.

According to aspects of the invention, a method for producing a battery cell is further provided, which method comprises executing the method for providing the separator according to aspects of the invention in such a way that, when the separator structure is formed by means of the additive method, the material is deposited around the anode and cathode of the at least one galvanic cell which replace the cavities. In the same way as the separator structure is formed around the electrodes of the at least one galvanic cell, further above-described components can be positioned in the separator according to aspects of the invention as required at suitable times during the production method for the separator according to aspects of the invention in order to be embedded therein. Consequently, this production method for the battery cell relates to the situation in which, during production of the separator, its functional elements, for example electrodes, busbars and pole terminals as well as hollow bodies for forming the duct system, are inserted into the separator structure.

It goes without saying that the features mentioned above and those still to be explained below can be used not only in the respectively indicated combination but also in other combinations or on their own, without departing from the scope of the present invention.

BRIEF DESCRIPTION OF THE DRAWING FIGURE

Further advantages and refinements of the invention can be gathered from the entirety of the description and the appended drawing.

The sole FIGURE shows a schematic cross-sectional view through an exemplary embodiment of a functionally integrated separator.

DETAILED DESCRIPTION OF THE INVENTION

The FIGURE shows a schematic cross-sectional view through an exemplary embodiment of a functionally integrated separator 1. Only a subregion of the separator 1 is shown here, wherein two electrodes 2, 3—an anode 2 and a cathode 3—of a galvanic cell are shown in addition to the separator 1. The FIGURE illustrates the basic principle according to which a corresponding battery cell can be constructed on the basis of the separator 1 according to aspects of the invention. The two electrodes are embedded into the separator 1. The separator material contains materials 4 which cure irreversibly, as a result of which the separator 1 achieves its mechanical strength in the final three-dimensional end form after a predetermined time.

In addition, lines 5 for liquid cooling of the electrodes 2, 3 are provided in the separator 1. As already described, these can be formed by inserting corresponding single- or double-layer hollow profiles into the structure of the separator during production of the separator. Furthermore, a busbar 6 embedded in the separator 1 is illustrated which. By means of the busbar 6, identical poles of the galvanic cells within the battery cell are interconnected with one another in series or in parallel depending on the desired design, which busbar, on account of its nature, is able to transmit relatively high currents.

What is claimed:

1. A separator for spatially separating and electrically isolating electrodes in a battery cell, wherein the separator comprises:
    a receptacle for at least one galvanic cell which comprises an anode and a cathode;
    a structure composed of conductive material for making contact with the at least one galvanic cell from outside; and
    a duct system forming a passageway for delivering a cooling fluid flow within the separator;
    wherein at least the receptacle and the duct system are integrally formed in the separator.

2. The separator as claimed in claim 1, wherein a material which cures with a time delay is contained in the separator, as a result of which the separator acquires an ultimate strength.

3. The separator as claimed in claim 1, wherein the structure of the separator has a porosity which permits ion transport between the anode and the cathode.

4. The separator as claimed in claim 1, wherein the duct system is formed by hollow molds arranged in the separator.

5. A battery cell comprising:
    the separator of claim 1;
    the at least one galvanic cell that is embedded in the separator and comprises the anode and the cathode, wherein by means of the structure composed of conductive material, the at least one galvanic cell can be contacted from outside; and
    a cooling circuit is formed by means of the duct system.

* * * * *